3,173,962
OXYCHLORINATION OF LOWER ALKANES
Richard T. Carroll and Elmer J. De Witt, Cuyahoga Falls, and Louis E. Trapasso, Maple Heights, Ohio, assignors to The B. F. Goodrich Company, New York, N.Y., a corporation of New York
No Drawing. Filed June 20, 1962, Ser. No. 203,709
12 Claims. (Cl. 260—659)

This invention relates to the conversion of hydrocarbons to olefins and halogenated products and more particularly pertains to the conversion of hydrocarbons to useful products such as olefins and halogenated hydrocarbons in high yields by the oxychlorination reaction in the presence of a novel catalyst.

The term "oxychlorination" is used herein as elsewhere in the art to refer to a reaction in which the source of chlorine employed for the chlorination reaction is gaseous hydrogen chloride which is made to give up its chlorine in useful form. The Deacon process, for instance, has been proposed and widely used with varying degrees of success for the oxidation of hydrogen chloride with air over a fixed body of copper chlorides which function catalytically to produce chlorine. One disadvantage of the Deacon process, when applied to the chlorination of hydrocarbons, as well as when used merely for the production of chlorine, arose from the decreasing effectiveness of the catalyst mass which had to be replaced and regenerated. The catalysts of the present invention do not appear to lose their activity even after prolonged periods of use. Several improvements and modifications have been made in the past in the original Deacon process and many of these have been applied to the oxychlorination of such diverse hydrocarbons and hydrocarbon derivatives as methane, ethane, ethylene, some of the chloroethylenes, and aromatics such as benzene.

The Deacon reaction which was developed originally to provide a means of oxidizing hydrogen chloride to chlorine is as follows:

$$2HCl + \tfrac{1}{2}O_2 \rightarrow H_2O + Cl_2$$

The reaction as written is exothermic and becomes less favorable with increasing temperature.

The Deacon reaction catalysts, which are most generally copper salts, are known to promote this reaction. Copper catalysts which have been used in the past for the chlorination of ethane, for instance, by means of air or oxygen and hydrogen chloride include copper oxides, copper chlorides, copper oxychlorides, copper silicate, and the like. All previously known reactions of the oxychlorination type have been carried out in the presence of a copper salt catalyst which often has been deposited upon a suitable carrier in either fixed bed or fluidization technique, and temperatures in the range of from 300 to 400° C. have generally been employed.

Many of the known modifications of the Deacon reaction, for the chlorination of organic compounds, have been without significant commercial success because the temperatures, at which the catalysts yield chlorine efficiently, are so high that pyrolysis, decomposition and/or oxidation of the organic compound becomes a dominating feature; further, conditions are often such that undesirable side reactions take place.

In the Deacon process and the more recent modifications of the Deacon process wherein a hydrocarbon is chlorinated, it is necessary to refrain from using high temperatures because many of the chlorinated hydrocarbon products are readily hydrolyzed by water at high temperatures while the same compounds, or the hydrocarbons from which they are made, are oxidized to carbon oxides by such agents as cupric oxychloride or oxygen at the high temperatures needed for chlorination. Numerous methods such as the use of catalyst promoters, multistage reactors and other special types of reactors have been used to improve the process as set forth for instance in U.S. Patents Nos. 2,448,255, 2,498,546 and 2,752,402.

It is known that *lower* rather than *higher* temperatures favor the release of chlorine in the Deacon process. In the past there has been a search for active catalysts which will perform at lower temperatures to give cleaner reactions (see U.S. 1,963,761 and 2,305,917, for instance). A more comprehensive review of the oxychlorination art appears in "Chemical Engineering Progress," vol. 46, No. 10, pages 483 et. seq. (1950).

The present process embodies contacting a mixture of hydrogen chloride and oxygen or an oxygen-bearing gas, preferably air, with the catalyst embodied herein in a reaction zone at elevated temperature, e.g. about 300–650° C. The chlorination and dehydrochlorination reactions are conducted simultaneously by reacting a hydrocarbon feed gas, e.g. an alkane having from 2 to 6 carbon atoms and preferably ethane, with hydrogen chloride and an oxygen bearing gas in a reaction zone at elevated temperatures in the presence of an iron phosphate catalyst which is more fully described below.

The catalyst embodied herein may be used, per se, in any convenient physical form although finely divided particles are preferred and it is even more preferred that the catalyst be deposited on or combined with an inert carrier such as asbestos, pumice, alumina, clay, silica gel, porous brick, and the like. The preferred support in the present process is a silica support. The reaction of the present invention may be carried out with the catalyst in either a fixed state or in a fluidized state, both of which are well known to those skilled in the art.

In the chlorination process, hydrogen chloride, air and ethane, for example, may be charged into the reactor containing the catalyst. Normally about 5 volumes of air are required per volume of hydrogen chloride to furnish sufficient oxygen to effect the conversion of all the chlorine contained in the hydrogen chloride to organic combination. The proportion of ethane to hydrogen chloride depends to some extent upon the distribution of products desired. Normally, for the preparation of ethyl chloride as a principal product, equal volumes of ethane and hydrogen chloride are charged. When higher chlorination products, such as ethylene dichloride, are desired, the proportion of ethane is reduced and when ethylene is desired as the main product, the ratio of volume of ethane to hydrogen chloride is increased.

In calculating the relative proportions of oxygen, air or oxygen-bearing gas to hydrogen chloride and hydrocarbon to be charged to the reactor, the following equations may be used:

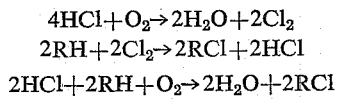

$$4HCl + O_2 \rightarrow 2H_2O + 2Cl_2$$
$$2RH + 2Cl_2 \rightarrow 2RCl + 2HCl$$
$$2HCl + 2RH + O_2 \rightarrow 2H_2O + 2RCl$$

wherein R is a hydrocarbon radical having from 2 to 6 carbon atoms and more preferably an aliphatic hydrocarbon.

The theoretical requirement of oxygen is thus 0.5 mole per mole of hydrogen chloride. When an olefin is produced in this reaction, hydrogen chloride is regenerated and can be recycled with fresh hydrocarbon and more oxygen or oxygen bearing gas.

In the present process it is preferred that the mole ratio of hydrocarbon to oxygen in the feed gas be between 1:1 and 10:1 respectively and a more preferred range is from 2:1 to 6:1. The molar ratio of hydrogen chloride to oxygen in the feed gases of the present process must be from 0.5:1 to 5:1 respectively and a more preferred range is from 1:1 to 3:1.

The products of the present reaction are predominantly useful olefins and chlorinated hydrocarbons. In the conversion of ethane by the present process, for instance, the useful products which are produced in from 80 to 100% yield include ethylene, ethyl chloride and sometimes 1,2-dichloroethane. The present reaction is a very "clean" reaction yielding only trace amounts of undesirable products such as higher chlorinated hydrocarbons, carbon oxides and methane. The relative proportion of ethylene and ethyl chloride, resulting from the conversion of ethane by the present process, will vary depending largely upon the reaction temperature and also somewhat upon the particular catalyst used. At the higher reaction temperatures (500-600° C. and higher) ethylene is the predominant product whereas at the lower temperatures (300-500° C.) larger proportions of ethyl chloride are produced in the process of this invention.

The space velocity of the feed gases used in the process of this invention is expressed as the volume of feed gas per volume of catalyst per hour. Space velocities of from 200 to more than 1000 may be employed in the present process although space velocities of from 300 to 600 are preferred.

The products of the present process, for instance the ethylene, ethyl chloride and 1,2-dichloroethane produced in the conversion of ethane, are useful for many purposes including the production of vinyl chloride monomer. Ethylene is readily chlorinated to 1,2-chloroethane, ethyl chloride is readily dehydrohalogenated to ethylene which in turn is easily chloriated to 1,2-dichloroethane and 1,2-dichloroethane is readily converted to vinyl chloride by dehydrohalogenation. Ethylene itself is a valuable monomer as is well known to those skilled in the art and 1,2-dichloroethane is a valuable solvent and chemical intermediate.

The catalysts useful in the present invention are iron phosphates. Stated more generally, it is essential that the catalysts employed in the present process contain an iron cation and a phosphate anion. Other metallic cations such as nickel, cobalt, copper, chromium, tin, lead, cerium, manganese, bismuth, magnesium, cadmium, vanadium and generally metals of groups I through IV of the Mendeleef periodic table may be used in conjunction with iron and many of these have been found to serve as promoters or activators when used in conjunction with iron in spite of the fact that they show little or no activity when used alone.

The phosphate anion which is an essential part of the catalyst embodied herein is an anion containing only phosphorous and oxygen including the orthophosphates, the polyphosphates, metaphosphates, ultraphosphates, pyrophasphates, monohydrogen phosphates, dihydrogen phosphates and others of the types disclosed in "Encyclopedia of Chemical Technology," by Kirk and Othmer, Interscience Encyclopedia, Inc., New York, volume 10, pages 403-435.

The present process is advantageous because it uses starting materials which are cheap by-products of the organic-chemical and petrochemical industries.

In the following illustrative examples the amounts of ingredients are expressed as parts by weight unless otherwise indicated. Whenever the "percent yields" do not add up to 100% total in a given experiment it is because only the yields of gaseous products are reported. In some cases there were trace amounts of high boiling products formed and these amounts were not determined.

*Example I*

An iron-nickel phosphate catalyst was prepared by dissolving 11.4 g. (0.042 mole) of ferric chloride and 10 g. (0.042 mole) of nickelous chloride hexahydrate in water and then stirring into the resulting solution 250 g. of a technical grade colloidal silica containing about 30% silica. To this mixture were added 8.4 g. (0.073 mole) of 85% phosphoric acid. The resulting mixture was heated at 120° C. until a hard gel resulted. The gel was then dried in a furnace at 500° C. The resulting dry chunks were broken up, sieved and the particles passing 8 to 18 mesh sieves were used as catalyst. The catalyst was then placed in a reactor which is more fully described below and heated to 600° C. under a stream of nitrogen or air prior to use.

All of the gases used were contained in cylinders and were passed through granular anhydrous calcium sulfate drying towers and medium porosity sintered glass filters before they entered the flowmeters. The gases were fed under a pressure of about 5 p.s.i.g. and their flow rates were measured by means of Fischer and Porter Tri-Flat variable area flowmeters. The flow rate of the gases was regulated by needle valves at the top of each flowmeter. The gases then passed into a manifold fitted with polytetrafluoroethylene stopcocks, and entered the top of a vertical reaction tube through an adaptor. The adaptor was fitted with a thermocouple well which extended to the bottom of the reaction tube allowing the thermocouple to reach any point in the reaction tube. The reaction tube was covered on the exterior with two about one foot in length and of about 60 ml. capacity. The reaction tube was covered on the exterior with two layers of asbestos-covered nichrome wire. During the reaction the inner wire had a continuous application of electric current to hold the reaction temperature at the desired level. The outer wire was energized electrically by a controlling pyrometer which was activated by the thermocouple. The reaction tube was packed with 50 ml. of catalyst prior to the reaction.

The bottom of the reaction tube was fitted with an adaptor having a side arm equipped with a stopcock and a small trap (25 ml. capacity) adapted to catch and hold liquids coming from the reaction tube. The exit gases were led off through the side arm and through a gas dispersion tube immersed about 12 inches in a water tower. The dispersed gas bubbled up through the water and the resulting exit gases were analyzed by gas chromatography in a Perkin-Elmer, Model 154 gas chromatography instrument. The gases were analyzed on three types of columns: (1) molecular sieves, (2) silica gel and (3) tricresyl phosphate on a Fischer Column Pack.

A reaction was run in the foregoing reaction tube apparatus employing the aforementioned catalyst employing a gaseous mixture having a mole ratio of 4:2:1 of ethane: hydrogen chloride: oxygen, a reaction temperature of 600° C. and a space velocity of 480. A 38% conversion was obtained of a gaseous mixture which contained 96% ethylene, no ethyl chloride, 3.6% carbon monoxide and 0.6% carbon dioxide.

Example II

The procedure of Example I was followed using the phosphate catalysts on a silica support indicated below. A reaction temperature of 600° C. was employed and a mole ratio of ethane to hydrogen chloride to oxygen of 4:2:1 respectively was used. Results of three experiments are tabulated below:

| Catalyst (mole ratio) | Space Velocity | Percent Conv. | Percent Yields | | | |
|---|---|---|---|---|---|---|
| | | | Ethylene | Ethyl Chloride | CO | CO₂ |
| Fe:Ni (1:1) | 480 | 42 | 92 | 0.1 | 6.8 | 0.5 |
| Fe:Pb (1:1) | 490 | 43 | 90 | .7 | 3.9 | 2.2 |
| Fe:Sn (1:1) | 420 | 41 | 87 | 2.6 | 5.0 | 1.4 |

Example III

The procedure of Example I was followed using a catalyst resulting from the reaction of ferric chloride with orthophosphoric acid in the mole ratios shown below and deposited on a silica carrier. The mole ratio of ethane to hydrogen chloride to oxygen was 4:2:1 respectively. The reaction temperature was 600° C.

| Mole ratio of FeCl₃ to H₃PO₄ | Space Velocity | Percent Conv. | Percent Yields | | | |
|---|---|---|---|---|---|---|
| | | | Ethylene | Ethyl Chloride | CO | CO₂ |
| 1:1 | 420 | 44 | 92 | 0 | 3.7 | 0.6 |
| 2:3 | 630 | 45 | 92 | 0 | 4.4 | .4 |
| 1:3 | 340 | 47 | 94 | 0 | 4.8 | .3 |

Example IV

In the following experiments a catalyst was used containing a phosphate of iron:nickel:chromium:lead:copper in the mole ratio of 1:1:1:1:0.13 respectively deposited on silica as described in the catalyst preparation step of Example I. The results are tabulated below:

| Mole ratio, Ethane:HCl:O₂ | Space Velocity | Reaction Temp., °C. | Conv., Percent | Percent Yields | | | |
|---|---|---|---|---|---|---|---|
| | | | | Ethylene | Ethyl Chloride | CO | CO₂ |
| 3:2:1 | 470 | 600 | 53 | 93 | 0.3 | 4.5 | 0.2 |
| 6:2:1 | 430 | 600 | 28 | 96 | .2 | 2.3 | .7 |
| 2.5:0.6:1 | 740 | 640 | 66 | 86 | 1.4 | 9.0 | .7 |

Example V

Iron:nickel and iron:copper pyrophosphate catalysts were used wherein the mole ratio of iron to other metal in the salt was 1:1 and the procedures described in Example I were followed. The results of several experiments are tabulated below:

| Mole ratio, Ethane:HCl:O₂ | Space Velocity | Temp., °C. | Catalyst | Conv., Percent | Percent Yields | | | |
|---|---|---|---|---|---|---|---|---|
| | | | | | Ethylene | Ethyl Chloride | CO | CO₂ |
| 6:2:1 | 520 | 430 | Fe:Cu (P₂O₇) on silica | 26 | 5.1 | 86 | 0.3 | 0.6 |
| 6:2:1 | 440 | 475 | do | 28 | 55 | 39 | 2.7 | 0.7 |
| 4:2:1 | 460 | 550 | Fe:Ni (P₂O₇) | 37 | 86 | 3.3 | 5.5 | 1.5 |
| 5:2:1 | 420 | 600 | Fe:Ni (P₂O₇) | 27 | 93 | 2.4 | 0.48 | 1.1 |
| 4:2:1 | 480 | 575 | Fe:Ni (P₂O₇) on alumina | 37 | 91 | 1.0 | 4.5 | 2.3 |

Example VI

Several experiments were carried out following the procedures given in Example I. The catalysts employed were phosphates or pyrophosphates deposited on an inert carrier. The results and other details of these experiments are tabulated below.

| Mole ratio, Ethane:HCl:O₂ | Space Velocity | Temp., °C. | Catalyst (mole ratio) | Conv., Percent | Percent Yield of Useful Products | |
|---|---|---|---|---|---|---|
| | | | | | Ethylene | Ethyl Chloride |
| 5:2:1 | 470 | 500 | Fe:Cr (3:1) (P₂O₇) on silica | 25.44 | 82.36 | 6.93 |
| 10:2:1 | 470 | 500 | do | 14.97 | 96.12 | 1.67 |
| 5:2:1 | 576 | 600 | Fe₄(P₂O₇)₃ on alumina | 31.73 | 92.29 | 0.06 |
| 5:2:1 | 576 | 590 | Fe:Ce (4:1) phosphate on silica | 30.48 | 88.61 | 3.34 |
| 4.2:2:1 | 515 | 590 | do | 35.07 | 87.40 | 2.65 |
| 5:2:1 | 576 | 580 | Fe:Co (3:1) phosphate on silica | 32.55 | 85.35 | 4.18 |
| 5:2:1 | 576 | 585 | Fe:Mn (1:1) phosphate on silica | 32.03 | 82.02 | 6.40 |
| 5:2:1 | 576 | 530 | Fe:Bi (1:1) phosphate on silica | 28.03 | 86.87 | 6.24 |
| 5:2:1 | 576 | 590 | Fe:Mg (1:1) phosphate on silica | 26.06 | 86.41 | 7.83 |
| 5:2:1 | 576 | 600 | Fe:Cadmium (1:1) phosphate on silica | 24.42 | 86.57 | 4.01 |
| 5:2:1 | 576 | 550 | Equimolar Fe:Co:Ni:Cr:Mn:Cu phosphate on silica | 33.98 | 89.22 | 3.21 |
| 5:2:1 | 576 | 550 | Fe phosphate on alumina | 31.73 | 92.29 | 0.06 |

Example VII

Several experiments were carried out following the procedures given in Example I. The catalysts employed were pyrophosphates deposited on an inert carrier. The results and other details of these experiments are tabulated below.

| Mole ratio, Ethane:HCl:$O_2$ | Space Velocity | Temp., °C. | Catalyst | Conv., Percent | Percent Yields | | | | |
|---|---|---|---|---|---|---|---|---|---|
| | | | | | $CH_2=CH_2$ | $CH_3CH_2Cl$ | $CH_2ClCH_2Cl$ | $CO_2$ | $CO$ |
| 6:2:1 | 340 | 350 | Cu:Fe, 1:10 on silica | 6.1 | 22.7 | 59.1 | 12.8 | 2.1 | 2.3 |
| 6:2:1 | 340 | 400 | ___do___ | 16.5 | 60.1 | 8.7 | 12.7 | 1.7 | 8.5 |
| 10:2:1 | 448 | 385 | Cu:Fe, 3:10 on silica | 7.3 | 13.3 | 56.6 | 25.2 | 0.9 | 2.3 |
| 10:2:1 | 448 | 500 | ___do___ | 14.7 | 91.5 | 0.6 | 0.3 | 1.4 | 6.3 |
| 6:2:1 | 360 | 475 | Fe:Cu, 1:1 on pumice | 13.9 | 10.4 | 84.3 | 1.8 | 0.6 | 1.9 |
| 6:2:1 | 386 | 375 | Fe:Cu, 1:1 on silica | 13.9 | 0.2 | 93.1 | 5.7 | 0.1 | 0.2 |
| 6:2:1 | 540 | 510 | ___do___ | 32.5 | 30.7 | 59.3 | 1.2 | 0.6 | 8.2 |

*Example VIII*

Several experiments were carried out following the procedures outlined in Example I. The catalysts employed were phosphates deposited on a silica carrier. The results and other details of these experiments are given in the table below.

| Mole ratio, Ethane:HCl:$O_2$ | Space Velocity | Temp., °C. | Catalyst | Conv., Percent | Percent Yields | | | |
|---|---|---|---|---|---|---|---|---|
| | | | | | $CH_2=CH_2$ | $CH_3CH_2Cl$ | $CO_2$ | $CO$ |
| 6:2:1 | 386 | 500 | Fe:Ca, 3:1 | 21.4 | 86.9 | 0.9 | 0.9 | 7.6 |
| 6:2:1.5 | 407 | 600 | Fe:Ca, 3:1 | 32.0 | 88.3 | Trace | 1.1 | 8.3 |
| 6:2:1 | 386 | 450 | Fe:Mg, 3:1 | 20.4 | 84.9 | 1.0 | 0.9 | 10.9 |
| 6:2:1 | 386 | 500 | Fe:Mg, 3:1 | 22.3 | 89.9 | 0.6 | 0.9 | 7.6 |
| 6:2:1 | 386 | 450 | Fe:Ba, 3:1 | 24.0 | 90.0 | 0.5 | 0.6 | 6.1 |
| 6:2:1.5 | 407 | 500 | Fe:Ba, 3:1 | 33.7 | 86.8 | 0.2 | 1.4 | 8.8 |

The experiments described in this and the preceding examples were carried out with similar results in a reactor in which the catalyst was maintained in a fluidized state.

We claim:

1. In the process for producing olefins and chlorinated alkanes by the oxychlorination of alkanes, the improvement which comprises passing a mixture of an alkane having from 2 to 6 carbon atoms, hydrogen chloride and oxygen over a catalyst consisting essentially of phosphate salts of iron, at a temperature of from about 300° C. to about 650° C., the molar ratio of hydrogen chloride to oxygen in said mixture being in the range of from 0.5:1 to 5:1.

2. The process of claim 1 wherein the iron phosphate catalyst also contains as a promoter at least one phosphate salt of a member selected from the group consisting of nickel, cobalt, copper, chromium, tin, lead, cerium, manganese, bismuth, magnesium, cadmium and vanadium.

3. In the process for producing ethylene and chlorinated ethane derivatives by the oxychlorination of ethane, the improvement which comprises passing a mixture of ethane, hydrogen chloride and oxygen over a catalyst consisting essentially of phosphate salts of iron, at a temperature of from about 300° C. to about 650° C., the molar ratio of hydrogen chloride to oxygen in said mixture being in the range of from 0.5:1 to 5:1.

4. The process of claim 3 wherein the mole ratio of ethane to oxygen is between 1:1 and 10:1 respectively.

5. The process of claim 4 wherein the mol ratio of hydrogen chloride to oxygen is in the range of 1:1 to 3:1 and the mol ratio of ethane to oxygen is in the range of 2:1 to 6:1.

6. The process of claim 4 wherein the space velocity of said mixture is from 200 to 1000 volumes thereof per volume of the catalyst per hour.

7. The process of claim 4 wherein the catalyst is iron phosphate on a silica carrier.

8. The process of claim 4 wherein the iron phosphate catalyst also contains as a promoter at least one phosphate salt of a member selected from the group consisting of nickel, cobalt, copper, chromium, tin, lead, cerium, manganese, bismuth, magnesium, cadium and vanadium.

9. The process of claim 8 wherein the catalyst is an iron-nickel phosphate deposited on finely divided silica.

10. The process of claim 8 wherein the catalyst is a phosphate of iron, nickel, chromium, lead and copper.

11. The process of claim 8 wherein the catalyst is an iron-copper pyrophosphate on silica.

12. The process of claim 8 wherein the catalyst is an iron-chromium pyrophosphate on silica.

References Cited by the Examiner

2,448,255   8/48   De Benedictis et al. ____ 23—219 X
2,952,714   9/60   Milam et al. _____ 260—662

FOREIGN PATENTS 517,009   9/55   Canada.

OTHER REFERENCES

Berkman et al.: Catalysis, Inorganic and Organic, Reinhold (1940), page 914.

Crawford: Chem. Engr. Progress, vol. 46 (1950), pp. 483–485.

LEON ZITVER, *Primary Examiner.*

UNITED STATES PATENT OFFICE
CERTIFICATE OF CORRECTION

Patent No. 3,173,962                          March 16, 1965

Richard T. Carroll et al.

It is hereby certified that error appears in the above numbered patent requiring correction and that the said Letters Patent should read as corrected below.

Column 3, line 51, for "1,2-chloroethane" read -- 1,2-dichloroethane --; line 53, for "chloriated" read -- chlorinated --; line 75, for "pyrophasphates" read -- pyrophosphates --; column 4, line 46, strike out "The reaction tube was covered on the exterior with two" and insert instead -- The reaction tube was a straight Vycor glass tube of --.

Signed and sealed this 24th day of May 1966.

(SEAL)
Attest:

ERNEST W. SWIDER                       EDWARD J. BRENNER
Attesting Officer                         Commissioner of Patents